…

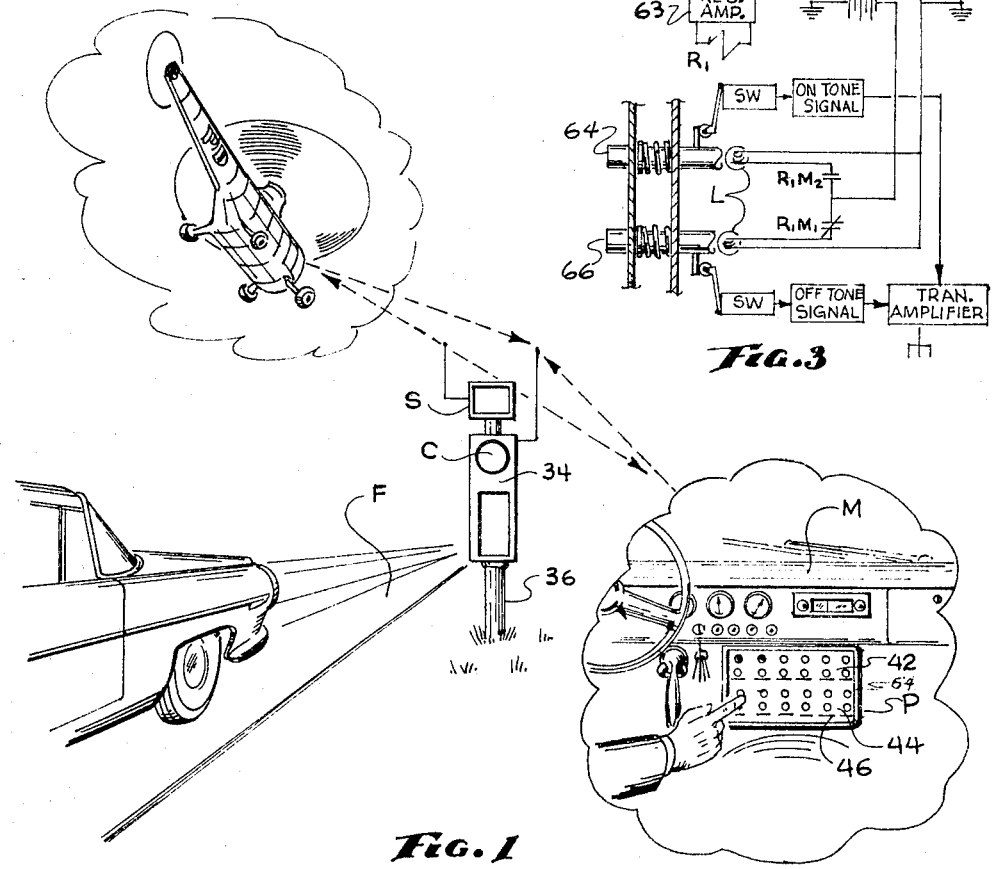
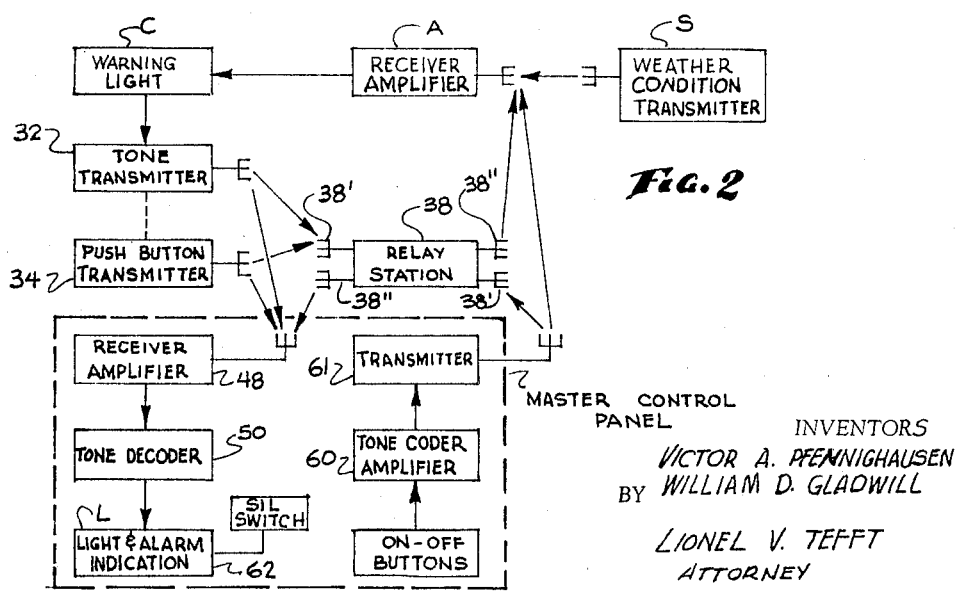

United States Patent Office 3,283,297
Patented Nov. 1, 1966

3,283,297
VEHICLE HIGHWAY WEATHER WARNING SYSTEM
Victor A. Pfennighausen, 1829 Marlborough Ave., Riverside, Calif., and William D. Gladwill, 3934 Ferndale Ave., San Bernardino, Calif.
Filed Nov. 8, 1963, Ser. No. 322,453
3 Claims. (Cl. 340—22)

This invention relates to motorist and patrol car weather warning systems.

One of the main objects of the present invention is to provide an automatically operated weather sensing caution light system for motorists that is co-ordinated with a location identification panel in the car and under the control of a cruising highway patrol officer.

There are certain sections of highway or freeway on which conditions such as fog, dust or rain are usually intermittently present. It is intended that yellow blinker caution lights be placed at desired spaced intervals on either side of the highway at such locations. Sensing devices having a combination of humidistat and light-sensitive mechanisms will be positioned in relation to said caution elements in a manner to automatically light and cause blinking thereof in times of emergency.

The yellow light caution system will be interlocked with and transmit signals to a master control panel on the highway cruiser having identically located advisory lightable switches under the control of the patrol officer.

Irrespective of the position of the patrol car in its area, the officer is immediately apprised of the exact location of emergency weather conditions directly influencing motorists, and may either hasten to such point or energize additional warning lights if so desired to further insure safe travel.

Another object of the invention is to provide stranded motorists with push button controls on the light standard and in the system whereby the officer is immediately advised of the exact location of a vehicle in trouble or a possible accident. Again he may energize additional caution lights from a remote position as he heads for an exactly-known position on his cruising route.

Still another object of the invention is in the provision of an automatically operated cautioning system integrated with an identifying signal location panel on a cruising patrol car.

Yet another object of the invention lies in a cruising location cautioning panel operable to energize motorist warning signals at any desired point.

A further object of the invention is to provide a motorist cautioning-light system having identical lightable switches on a control panel whereby testing of an individual light from a remote position is permitted.

A still further object of the invention is in the provision of an integrated, automatically operated, motorist cautioning light system and a position identifying, manually operable control panel on a cruising patrol car.

These and other objects and advantages of the present invention will become apparent to those skilled in the art upon consideration of the following detailed description of the preferred embodiment thereof, reference being had to the accompanying drawings, wherein:

FIGURE 1 is a schematic view, showing the manner of locating the automatically operated cautioning lights and cruiser location identification lightable switch panel;

FIGURE 2 is a schematic view of the transmitting system;

FIGURE 3 is a schematic view of the panel switch and control system;

Figure 4:
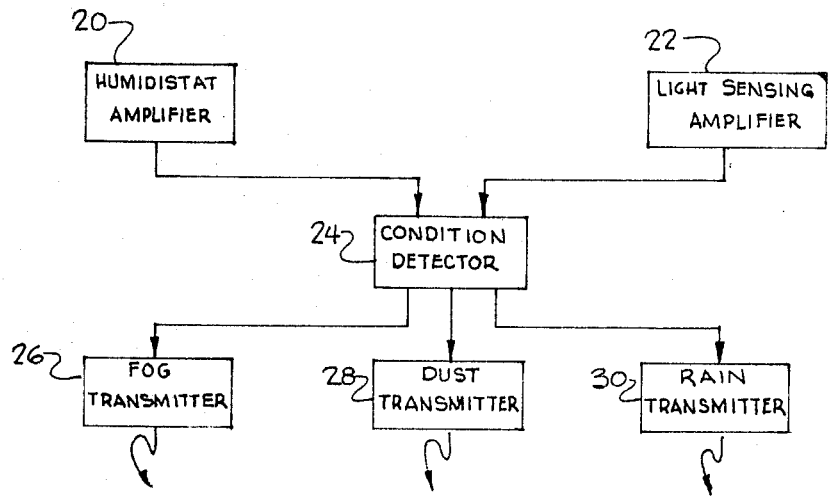
FIGURE 4 is a general schematic view of the weather sensing system.

Before referring specifically to the drawings, it will be understood that a preferred embodiment of the invention has been disclosed. However it is understood that the remote location identifying and caution light control panel might well be located in an airborne vehicle.

It is also to be understood that the motorist cautioning elements might take a somewhat different form without departing from the spirit of the invention. Likewise, the nature of the weather-sensing mechanism could be changed and the physical structure of the remote lightable switch location panel varied in many respects.

The signalling system in which conventional elements have been shown generally might also be modified in many ways, including the use of various types of weather-sensing devices.

In FIGURE 1 of the drawings, the general location of the fundamental elements and remote cruiser control panel is disclosed in preferred form. Again it might be understood that the exact location of the caution lights or elements, the sensing device, and nature of the highway or freeway may be varied to suit physical and geographical locations.

A freeway type of installation has been disclosed. A dual set of yellow caution light signals, one of which is shown, generally referred to as C, are disposed on opposite sides of the freeway F at desired or necessary distances such as a mile, half-mile or less. They need not be placed along the entire freeway, or on both sides thereof, and is intended that they be used at critical points along the coast where fog or heavy rains are prevalent or at places where severe dust storms often occur. Areas of intermittent heavy smog might also be so guarded.

Sensing devices consisting of a combination humidistat bolometer, photocell or light-sensing apparatus of conventional construction have been referred to generally as S. These devices may be disposed between the spaced highways in a manner to activate either a dual set or fore-and-aft pairs of caution signals C.

The sensing devices S may have several or all of the following functions: they will be capable of detecting the difference between fog and rain; they will detect the difference between fog and smoke, dust or dense smog; they will detect the differences in magnitude of a fog; they will detect the magnitude of smog in an area to a certain extent; as well as dust or smoke; they will be capable of sending a signal to automatically operate the caution lights C or to alarm a remote point as to immediate weather conditions.

The method of using the sensing devices S will be to interlock the output of the two sensing device signals. The measuring output signals will be interlocked or integrated in such a manner as to require a certain level of output from both the humidistat and light sensing device before fog will be indicated. Similarly, if a present level output from the humidistat alone is received, then the system will indicate rain or near rain conditions. If an output from the light sensing device only is received, then dust, smoke, or extreme smog conditions exist.

Figure 5:
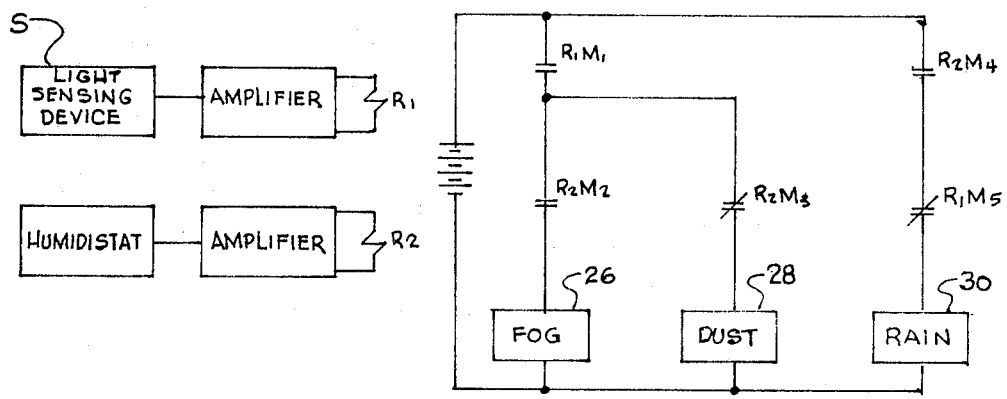
FIGURE 5 is a schematic view showing the electrical system in the sensing device.

In FIGURES 4 and 5 of the drawings, a schematic outline of the combined humidistat and light-sensing device S are shown as well as the electrical circuit of the condition detector. FIGURE 4 shows the general arrangement, including a humidistat amplifier 20, light-sensing amplifier 22, a condition detector 24, fog transmitter 26, dust transmitter 28, and rain transmitter 30.

The conditioning electrical circuits are shown in FIGURE 5. Thus, when the sensing device S signals fog conditions, the circuit $R_1M_1$ and $R_2M_2$ is completed to the fog transmitter 26. When the device signals dust, the circuit is completed through $R_1M_1$ and $R_2M_3$ to the dust transmitter 28. When rain conditions exist, circuit is completed through $R_2M_4$ and $R_1M_5$ to the rain transmitter 30. All condition signal transmission to the caution lights C results in activation and blinking.

The positioning of the caution lights C may be varied to the point of overhead suspension. The warning or blinking caution lights C each contain a tone transmitter 32 which will transmit, when activated by the warning light being energized will indicate to a patrol vehicle assigned to the area through a master location control panel generally referred to as P. A receiver amplifier activates the caution lights C.

A push button transmitter 34, for stranded motorists or for use in case of accident, may or may not be located on each caution light standard 36. Under certain conditions of remoteness, a relay station 38 will be required for transmission of the signals.

All signals are transmitted to a single location or master control panel P in a patrol car M cruising in the area containing the warning lights or elements L, FIGURE 3. The master control panel P not only receives the signals from each of the lights, or pairs or series of lights identifying the exact freeway section, but is also capable of operating the warning system at the designated section of highway.

The control panel P is structurally fashioned to simulate in some degree the section of freeway patrolled by the cruising vehicle. A series 42 of switches in conjunction with the lights L receives the signals transmitted from the caution lights C on the right-hand side of the freeway, and a parallel disposed series of lightable switches 44 receives signals transmitted from the warning lights on the left-hand side of the freeway. Location designation of the respective lights is contained in the brackets 46. The master control board discloses six pairs of area-designating lights, but this is for descriptive purposes only, and any number could readily be used.

In FIGURE 1 the control panel is outlined and indicates that signals from the caution lights C are received by a receiver amplifier 48 and then transferred to a tone decoder 50 and then to the light L in each of the "on" switches in the parallel series 42 and 44, respectively. The "on" switches are of the spring type and are shown in FIGURE 3, being of the type which after depression automatically returns to initial position. Normally, the "on" switches are not lighted, and are activated only when energized by signals from the caution lights, which in turn are energized by the sensing devices S or the "ON" push button. As shown in FIGURE 2, the signals may come directly from the transmitter in the warning lights or be relayed through the remote relay station 38 having appropriate input and output antennae.

A series of "off" light bulb switches 54 parallels the right of the freeway caution light "on" switches 42, and a similarly disposed series of "off" switches parallels the left side of the freeway "on" switches 44. The "off" switches are also return spring switches, and are lighted by the elements L. The "on" or "off" series of spring-operated light switches are adapted to operate the warning system at any designated section through a tone coder 60, transmitter 61, and then directly to or through relay 38 having input and output antennae 38' and 38'' to the receiver amplifier as shown in FIGURE 2. An audible alarm 62 of any conventional type and having a silencing switch is connected to the warning light system.

In FIGURE 3 the electrical circuit for the control panel switches is shown. The "on" tone signal switch 64 and the "off" tone signal switch 66 are connected to a power supply through the circuits shown in such a manner that the light bulbs L in the "off" switches normally glow, and are only extinguished when the light bulbs L in the "on" switches are activated. The "on" and "off" light bulb switches and the master control panel may be changed substantially as long as indication of the operation of the light bulbs becomes immediately apparent, and there is the ability to manually operate the switches to energize the desired caution light bulbs C from the remote panel in the cruising patrol car.

Operation of the manual push button on a caution light standard by a stranded motorist, or in case of an accident, will also, as shown in FIGURE 2, light the bulb L in the properly designated "on" switch, indicating area location. Of course only a single light on the panel will be energized and indicate exact freeway location to the patrol officer.

The operation of the freeway or highway warning system is relatively simple. The weather sensing devices S operate the blinking yellow caution lights automatically. By feedback transmission, a light appears on a patrol officer's vehicle control panel indicating the exact location of fog, dust or rain. The officer may then energize other caution lights by manual operation of the "on" buttons as desired.. He may turn on warning lights in sections not yet affected by the weather, but operation of the "off" buttons in sections affected by weather will not turn out the caution lights. This permits a definite check of the operativeness of all caution lights in the patrolled area directly from the cruising patrol car. The stranded motorist push-button control is so included in the signal circuit as to become a part thereof, although it is not essential to the system as a whole.

While we have shown and described in considerable detail what we believe to be the preferred form of our invention, it will be understood by those skilled in the art that various changes may be made in the several parts thereof, without departing from the broad scope of the invention as defined in the following claims.

We claim:
1. A highway patrol monitoring and traffic control system, comprising:
   highway caution lights disposed on dangerous weather road sections, said sections having theerin weather sensing apparatus for automatically eenrgizing said lights;
   an operator controlled area patrol car or air-borne vehicle for monitoring and controlling said caution lights;
   a master caution light indication and control panel located in said patrol car, said panel having signalling elements simulating position and indicating exact location of said caution lights;
   means for transmitting individual caution light activation signals to said control panel; and
   operator controlled means on said panel for activating or monitoring any of said caution lights.
2. A device as set forth in claim 1 in which said control panel signalling elements simulating caution light position are operator controlled by a series of *on* and *off* switches.
3. A device as set forth in claim 1 in which said caution lights and transmitting means are mounted on standards having a series of switches thereon, which switches are hooked into said transmitting means for actuation by a stranded motorist to indicate on the control panel of said patrol vehicle the position of the stranded motorist.

References Cited by the Examiner
UNITED STATES PATENTS

| | | | |
|---|---|---|---|
| 2,719,284 | 9/1955 | Roberts et al. | 340—151 |
| 2,849,701 | 8/1958 | Clark | 340—74 X |
| 2,902,669 | 9/1959 | Lucarelli | 340—22 |

THOMAS B. HABECKER, *Acting Primary Examiner.*

A. H. WARING, *Assistant Examiner.*